US012145285B2

(12) United States Patent
Darwinkel

(10) Patent No.: US 12,145,285 B2
(45) Date of Patent: Nov. 19, 2024

(54) DOMESTIC APPLIANCE COMPRISING A DETACHABLE MODULE

(71) Applicant: KONINKLIJKE PHILIPS N.V., Eindhoven (NL)

(72) Inventor: Geert-Jan Darwinkel, Winsum (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/408,649

(22) Filed: Aug. 23, 2021

(65) Prior Publication Data

US 2021/0379779 A1 Dec. 9, 2021

Related U.S. Application Data

(63) Continuation of application No. 16/066,364, filed as application No. PCT/EP2016/082796 on Dec. 29, 2016, now Pat. No. 11,110,619.

(30) Foreign Application Priority Data

Jan. 12, 2016 (EP) .................................... 16150829

(51) Int. Cl.
*B26B 19/46* (2006.01)
*B26B 19/38* (2006.01)

(52) U.S. Cl.
CPC .......... *B26B 19/46* (2013.01); *B26B 19/3813* (2013.01); *B26B 19/3873* (2013.01)

(58) Field of Classification Search
CPC .. B26B 19/3873; B26B 19/46; B26B 19/3813
See application file for complete search history.

(56) References Cited

U.S. PATENT DOCUMENTS 1,554,159 A * 9/1925 Hodges ................... B26B 19/46 362/115
1,676,183 A * 7/1928 Garfunkle ............... B26B 21/46 362/115

(Continued)

FOREIGN PATENT DOCUMENTS

CN 1640632 A 7/2005
CN 2776633 Y 5/2006

(Continued)

OTHER PUBLICATIONS

International Search Report and Written Opinion, International Application No. PCT/EP2016/082796, Mailed on Mar. 29, 2017.

*Primary Examiner* — Evan H MacFarlane
*Assistant Examiner* — Fernando A Ayala

(57) ABSTRACT

The present application relates to a domestic appliance comprising a mechanical function unit having a movable member, a housing containing a motor to operate the movable member to carry out a primary function of the appliance, and an electrical function unit having an electrically operative member to perform a secondary function of the appliance that supports the primary function performed by the mechanical function unit. The electrical function unit comprises a module positioned between the mechanical function unit and the housing. The electrical function unit comprises a generator to convert mechanical energy generated by the motor located in the housing into electrical energy to power the electrically operative member.

18 Claims, 7 Drawing Sheets

(56) References Cited

U.S. PATENT DOCUMENTS 2,186,627 A * 1/1940 Davies .................... B26B 19/46 362/115
2,195,423 A * 4/1940 Powell .................... B26B 19/46 362/115
2,243,483 A * 5/1941 Molnar ................... B26B 19/46 362/115
2,279,341 A 4/1942 Powell
2,310,166 A * 2/1943 Way ........................ B25F 5/021 362/89
2,383,421 A * 8/1945 Schultz ................... B26B 19/46 15/257.1
2,595,287 A * 5/1952 Perry ................... H01R 25/003 362/115
2,914,655 A * 11/1959 Swift ...................... B26B 19/46 362/115
3,359,635 A * 12/1967 Jepson ................... H01R 29/00 30/DIG. 1
3,781,990 A * 1/1974 Loner ................... B26B 19/265 30/34.1
5,084,967 A 2/1992 Morita
5,427,002 A * 6/1995 Edman ...................... B25F 3/00 173/217
5,533,266 A * 7/1996 Kelman .................. B26B 19/00 132/200
5,797,670 A * 8/1998 Snoke ..................... B25F 5/029 24/270
5,905,359 A * 5/1999 Jimena ................ H01M 50/213 320/114
6,131,288 A 10/2000 Westerhof
RE38,634 E 10/2004 Westerhof et al.
7,357,526 B2 * 4/2008 Zeiler ..................... B25B 23/18 362/120
8,096,305 B1 * 1/2012 Cheney .................. A45D 29/02 132/73.5
8,256,472 B2 9/2012 De Vries et al.
8,424,615 B2 * 4/2013 Baumann ................ B25F 5/021 173/217
2004/0194316 A1 * 10/2004 Lin ......................... B26B 19/46 30/43.6
2005/0174764 A1 8/2005 Thuma et al.
2005/0177139 A1 * 8/2005 Yamazaki .............. A45D 26/00 606/9
2005/0276041 A1 12/2005 Liao
2006/0174487 A1 * 8/2006 Andis ..................... B26B 19/46 30/34.05
2006/0277768 A1 * 12/2006 van Rijen ............ B23D 59/003 30/388
2008/0034589 A1 2/2008 Nearing
2008/0055889 A1 * 3/2008 Anderson ............... B25B 23/18 362/119
2008/0176181 A1 * 7/2008 Putz ......................... A61C 1/00 433/104
2008/0250645 A1 * 10/2008 Tringali .................. B26B 19/46 362/115
2009/0060622 A1 * 3/2009 Lian ................... A46B 15/0016 401/28
2009/0066177 A1 * 3/2009 Loke .................... H02K 7/1853 310/75 A
2010/0000094 A1 * 1/2010 Lombardo ............. B23D 59/00 30/123
2010/0145595 A1 6/2010 Bellistri et al.
2010/0198134 A1 * 8/2010 Eckhouse ............... B26B 19/46 604/20
2011/0067243 A1 * 3/2011 Darwinkel .......... B26B 19/3873 30/42
2011/0214289 A1 9/2011 Maichel
2013/0011177 A1 * 1/2013 Kuo ..................... A61C 17/227 15/22.1
2014/0173904 A1 * 6/2014 Halmut ................... B26B 19/46 30/293
2015/0080866 A1 * 3/2015 Verhagen ............... A61B 18/20 606/9
2015/0101201 A1 * 4/2015 Jutte .................. B23K 26/0096 30/537
2015/0126981 A1 * 5/2015 Verghese ............. A61B 18/203 606/9
2015/0133903 A1 * 5/2015 Moeskops .......... B23K 26/0643 606/9
2015/0298325 A1 * 10/2015 Taijeron .................. B26B 19/46 33/281
2015/0338060 A1 11/2015 Darwinkel et al.
2016/0143410 A1 * 5/2016 Stampe ................... F21V 21/00 362/115
2018/0207822 A1 * 7/2018 Fuerst ..................... B26B 19/46
2018/0222068 A1 * 8/2018 Halmut ................... B26B 19/20
2018/0310945 A1 11/2018 Philipp

FOREIGN PATENT DOCUMENTS

| | | | |
|---|---|---|---|
| CN | 201816069 | U | 5/2011 |
| DE | 20201967 | U1 | 5/2002 |
| DE | 202015100475 | U1 | 2/2015 |
| EP | 2236054 | A1 | 10/2010 |
| FR | 2105569 | A5 | 4/1972 |
| GB | 873918 | A | 8/1961 |
| WO | 2009147561 | A1 | 12/2009 |
| WO | 2013027136 | A1 | 2/2013 |

* cited by examiner

DOMESTIC APPLIANCE COMPRISING A DETACHABLE MODULE

CROSS-REFERENCE TO PRIOR APPLICATIONS

This application is a Continuation application of U.S. National Phase application under 35 U.S.C. § 371, Ser. No. 16/066,364, filed on Jun. 27, 2018, which claims the benefit of International Application Serial No. PCT/EP2016/082796, filed on Dec. 29, 2016, which claims the benefit of European Application No. 16150829.6, filed on Jan. 12, 2016. These applications are hereby incorporated by reference herein.

FIELD OF THE INVENTION

The present invention relates to a domestic appliance. In particular, it relates to an appliance for cutting hair such as a shaver, a hair clipper or a trimmer. The invention also relates to an electrical function unit for such an appliance that performs an electrically operated secondary function that supports a mechanically operated primary function carried out by the appliance.

BACKGROUND OF THE INVENTION

The primary function of a shaver or hair trimmer is to cut hair and they are generally provided with a movable cutting blade for this purpose. More recently, shavers, clippers or hair trimmers are additionally equipped with a secondary, electrically operated device to perform a secondary function to enhance or complement the primary hair cutting function. For example, a shaver is known that has a laser line generator for projecting a laser line onto the skin. A user can then rely on this line to assist in aligning or guiding the cutting blade relative to the hair that is to be cut. It is also known to provide shavers or other hair cutting devices with LEDs to illuminate the skin whilst shaving or ultrasonic mist generators for spraying a substance onto the skin. Shavers incorporating image capture devices, facial contour scanning devices or sensors for detecting transepidermal water loss, humidity and temperature are also envisaged, all of which require a source of electrical power to operate.

A domestic appliance, such as an appliance adapted to perform a shaving process as a primary function and which also has means for generating electrical energy to carry out a secondary function, is known from WO 2009/147561 A2.

European patent application document EP 2 236 054 A1 discloses a body grooming device comprising a head section, a hand piece section and an attachment section. The attachment section being detachably arranged between the head and hand piece sections. The attachment section is disclosed to comprise a powered unit which is either driven via an energy source independent from the hand piece section, mechanically driven by a power output driven by a drive in the hand piece, or by electrical energy supplied by an electric energy source in the hand piece.

US patent publication U.S. Pat. No. 2,243,483 discloses a detachable light attachment unit for an electric razor. The light attachment unit and the razor comprising a plug and socket configuration to power the light bulb in the attachment from an electrical power source in the main body of the electric razor.

Conventionally, the components relating to the mechanical cutting function and to the secondary electrical function are integrally embodied in a housing of the device with electrical energy for the secondary electrical function being supplied directly from the same power source, such as mains power or batteries, as supplied to a motor that drives a cutting blade to carry out the primary function of the device. This arrangement limits the flexibility of the device from a user standpoint as they are forced to buy additional devices for each different type of secondary electrical function they require. It is also necessary for manufacturers to design and manufacture each device having a different secondary electrical function separately, thereby increasing cost and complexity.

SUMMARY OF THE INVENTION

It is an object of the invention to provide a domestic appliance, such as a shaver, hair trimmer or clipper, that substantially alleviates or overcomes one or more of the problems mentioned above.

The invention is defined by the independent claims. The dependent claims define advantageous embodiments.

According to the present invention, there is provided a domestic appliance comprising a mechanical function unit having a movable member, a housing containing a motor to operate the movable member to carry out a primary function of the appliance, and an electrical function unit having an electrically operative member to perform a secondary function of the appliance that supports the primary function performed by the mechanical function unit, wherein the electrical function unit is contained in a detachable module positioned between the mechanical function unit and the housing.

By providing the electrical function unit in a detachable module, the flexibility of the appliance is increased because the housing and mechanical function unit can be used with different modules, i.e. modules containing electrical function units for carrying out different secondary functions. Alternatively, the module can be removed altogether if no secondary function is required. The mechanical function unit and the housing are a common platform to which different modules for carrying out various electrical functions may be attached.

The electrical function unit comprises a generator to convert mechanical energy generated by the motor into electrical energy to power the electrically operative member.

By arranging the electrical function unit as a module that is positioned between the mechanical function unit and the housing and adapting the electrical function unit to convert mechanical energy generated by the motor into electrical energy to operate the electrically operative element, no electrical connection between the module and the housing and/or the mechanical function unit is necessary, thereby simplifying the design and ensuring that only a mechanical connection exists between the module and the housing and the module and the mechanical function unit. Furthermore, it becomes possible to associate different types of electrical function unit with the same housing and mechanical function unit as required. The housing and the mechanical function unit effectively become a standard platform to which different types of electrical function unit may be mounted during manufacture, thereby avoiding a complex re-design of the appliance to suit a different electrical function unit.

Advantageously, the module comprises a transmission that couples the motor to the movable member in the mechanical function unit and drives the generator.

As the transmission or drive train between the housing and the mechanical function unit is part of the module, the transmission can easily be replaced in the event of failure by replacing the module without having to tamper with either the housing or the mechanical function unit.

Preferably, the module comprises an enclosure having a first interface that cooperates with the housing to mount the module to the housing and a second interface that cooperates with the mechanical function unit to mount the mechanical function unit to the module and couple the motor in the housing to the movable member in the mechanical function unit.

By providing an enclosure having parts that enable it to interface with each of the housing and the mechanical function unit, the module becomes a self-contained, independent or discrete unit that, in addition to providing a secondary electrical function, also couples the motor to the movable member of the mechanical function unit.

The transmission and the first interface are preferably configured so that the transmission couples with the motor when the module is mounted to the housing.

If the act of mounting the first interface to the housing also couples the transmission to the motor, the task of attaching the module to the housing becomes very straightforward.

The transmission and the second interface may also be configured so that the transmission couples with the movable member when the mechanical function unit is mounted to the module.

If the act of mounting the mechanical function unit to the module also couples the transmission to the movable member, the task of attaching the mechanical function unit to the housing becomes very straightforward. It is also envisaged that, in the absence of a module, a user may couple the mechanical function unit directly to the housing so that the motor will drive the movable member so that the appliance carries out its primary function without any additional secondary electrical function.

In a preferred embodiment, the transmission includes a drive gear that rotates in response to operation of the motor to drive the generator.

By providing the module with a generator it generates its own electrical energy harnessed from the mechanical energy in the transmission between the motor and the movable member, thereby avoiding the need to provide any electrical connection between a power supply, such as a battery, in the housing and the electrical function unit.

Preferably, the generator comprises a drive pinion in engagement with the drive gear of the transmission so that the generator is operated to generate electrical energy when the drive gear rotates.

By coupling the transmission to the generator via a drive gear and drive pinion, the speed of the transmission can be controlled relative to the speed of the generator motor by selecting the relative sizes of the drive pinion and drive gear accordingly.

Advantageously, the transmission comprises a drive shaft, which may protrude from the enclosure, and which engages with the movable member of the mechanical function unit, the drive shaft rotating in response to operation of the motor.

A drive shaft enables the drive of the motor to be transmitted through the module to the mechanical function unit.

In a preferred embodiment, the mechanical function unit comprises an actuating mechanism that couples the drive shaft to the movable member.

An actuating mechanism allows rotation of the shaft to be converted into a desired movement of the movable member at the required speed. If, for example, the movable member is a reciprocating cutting blade, the actuating mechanism may reciprocate the blade at a predetermined frequency.

It is also envisaged that the electrical function unit may comprise multiple modules each of which have a different electrically operative element for carrying out different respective secondary functions, said multiple modules being attached to each other and positioned between the mechanical function unit and the housing.

By providing multiple modules, more than one electrical function may be carried out simultaneously.

In a preferred embodiment, the mechanical function unit may be a hair removal device and the movable member may then be a cutting blade.

The present invention have particular application to hair removal devices that incorporate a mechanically operated device for cutting hair and which may also have a secondary electrically powered device, such as a laser line generator, an LED or a sensor, to complement operation of the mechanically operated device.

According to another aspect of the invention, there is provided a module containing an electrical function unit for a domestic appliance according to the invention, the module being detachably mountable to a mechanical function unit having a movable member and a housing that contains a motor so as to extend between the mechanical function unit and the housing and so that the movable member is drivingly engaged with the motor through the module to carry out a primary function of the appliance, the electrical function unit including an electrically operative element that performs a secondary function to support the primary function performed by the mechanical function unit.

An end user who is already in possession of a domestic appliance according to the invention and who wishes to use an electrical function other than the electrical function carried out by the module of their device, may purchase additional modules capable of performing other electrical functions for use with the housing and mechanical function unit of their device.

According to another aspect of the invention, there is provided a shaver comprising a hair cutting unit having a movable blade for cutting hair, a housing containing a motor to reciprocate the blade, and a module detachably mountable to the hair cutting unit and the housing so as to extend between the hair cutting unit and the housing.

In a preferred embodiment of this aspect of the invention the module comprises a laser line generator.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
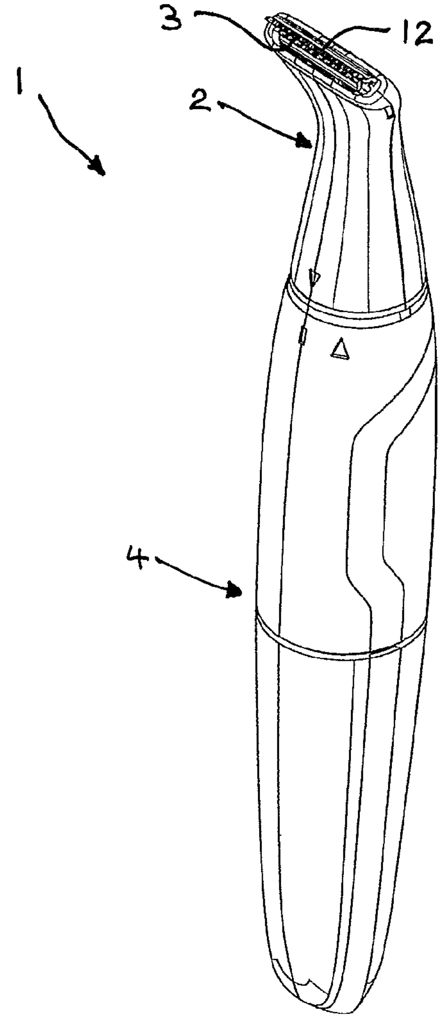
FIG. 1 shows a perspective view of an assembled hair removal device according to an embodiment of the invention, without a module positioned between the housing and the mechanical function unit.

With reference to the drawings, there is provided a domestic appliance in the form of a hair removal device 1 such as a shaver, trimmer or hair clipper, comprising a mechanical function unit 2 having a movable member 3, a housing 4 containing a motor 5 to operate the movable member 3 to carry out the primary function of cutting hair, and an electrical function unit 6 having an electrically operative member 7 to perform a secondary function that supports or complements the hair cutting function performed by the mechanical function unit 2. The electrical function unit 6 is adapted to convert mechanical energy generated by the motor 5 into electrical energy to power the electrically operative member 7. The electrical function unit 6 is wholly contained within a module 8 that is positioned between the mechanical function unit 2 and the housing 4.

FIG. 1 shows a hair removal device 1 according to an embodiment of the invention with the mechanical function unit 2 attached to the housing 4 but no module 8. In this configuration, the device 1 is only capable of carrying out its primary function namely, the cutting of hair.

Figure 2:
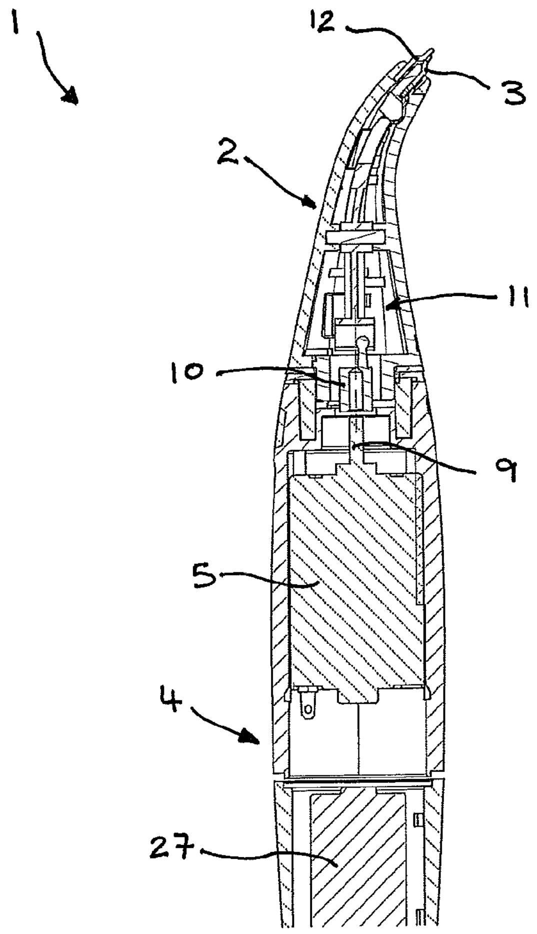
FIG. 2 shows a partial cross-sectional side elevation of the device shown in FIG. 1.

FIG. 2 shows the same device as shown in FIG. 1 but with the mechanical function unit 2 detached from the housing 4. The mechanical function unit 2 may be a push fit on the housing 4 or there may be a twist lock arrangement of known type that attaches the mechanical function unit 2 to the housing 4.

Figure 3:
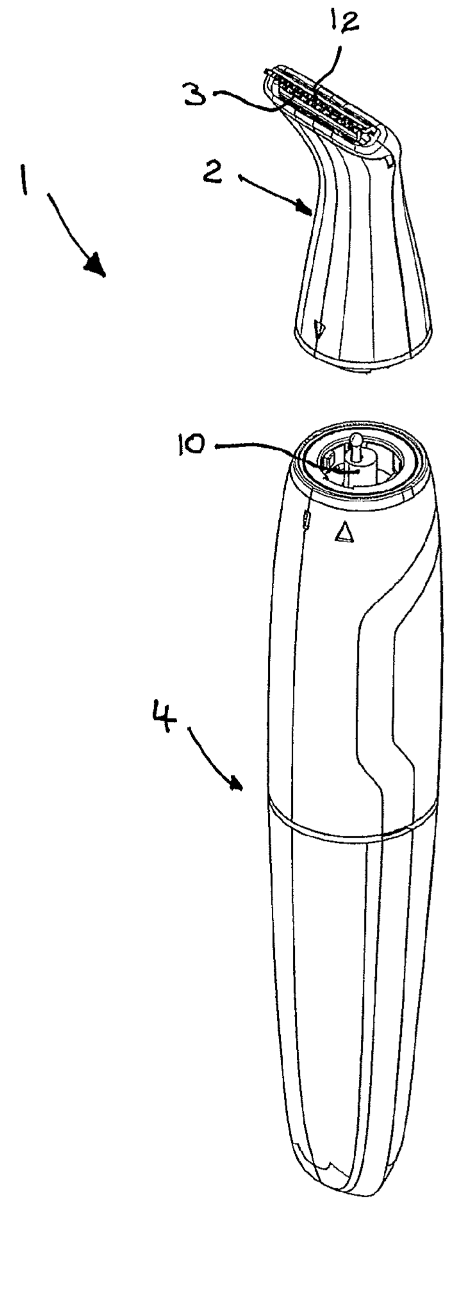
FIG. 3 shows the perspective view of FIG. 1 with the mechanical function unit detached from the housing.
Figure 4:
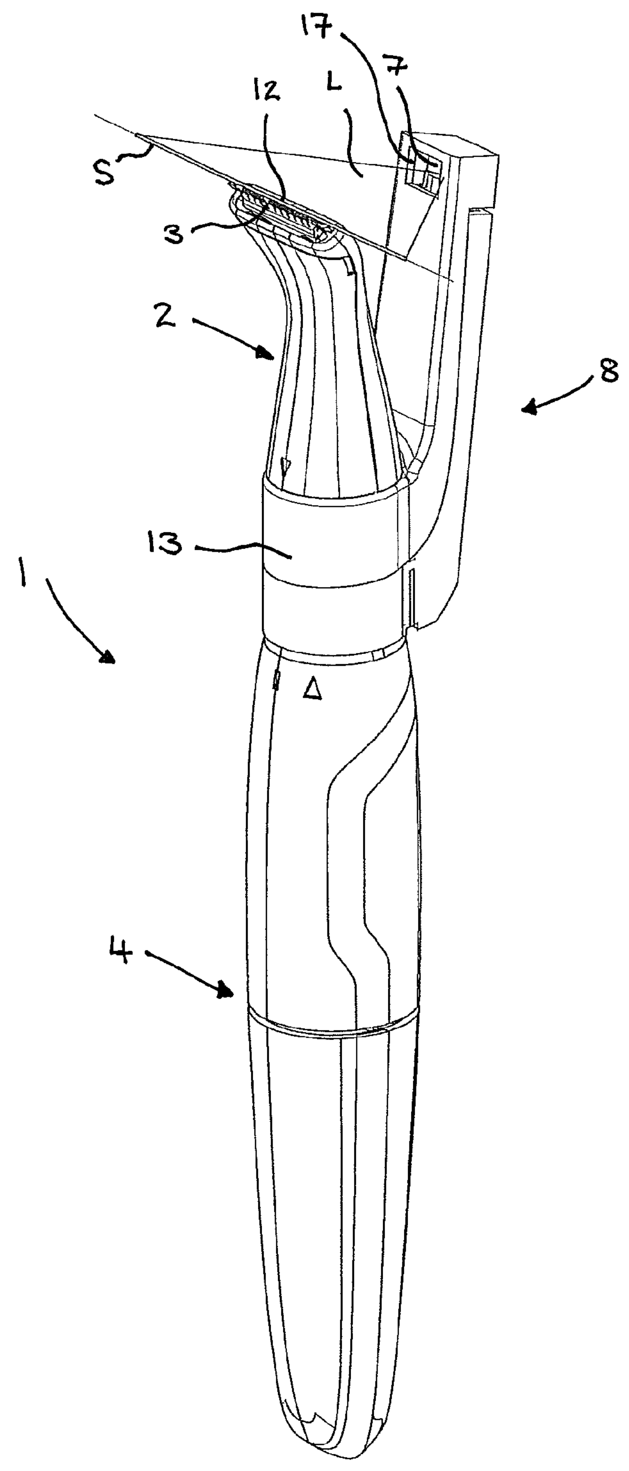
FIG. 4 shows the perspective view of FIG. 3 with a module positioned between the housing and the mechanical function unit.
Figure 5:
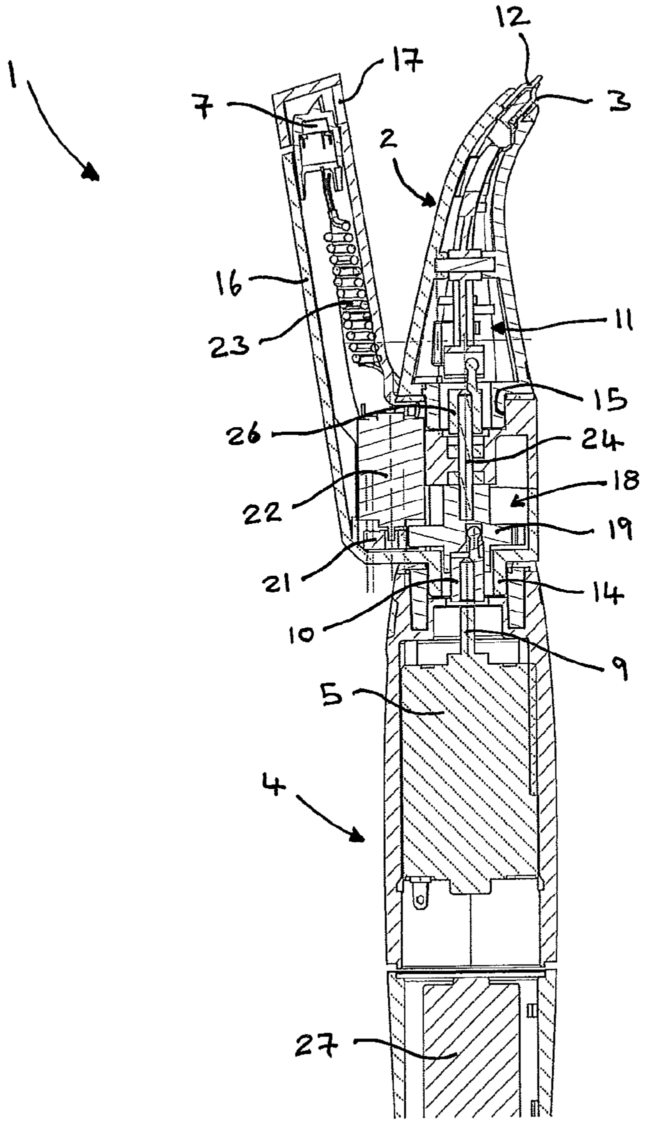
FIG. 5 shows a partial cross-sectional side elevation of the device shown in FIG. 4.
Figure 6:
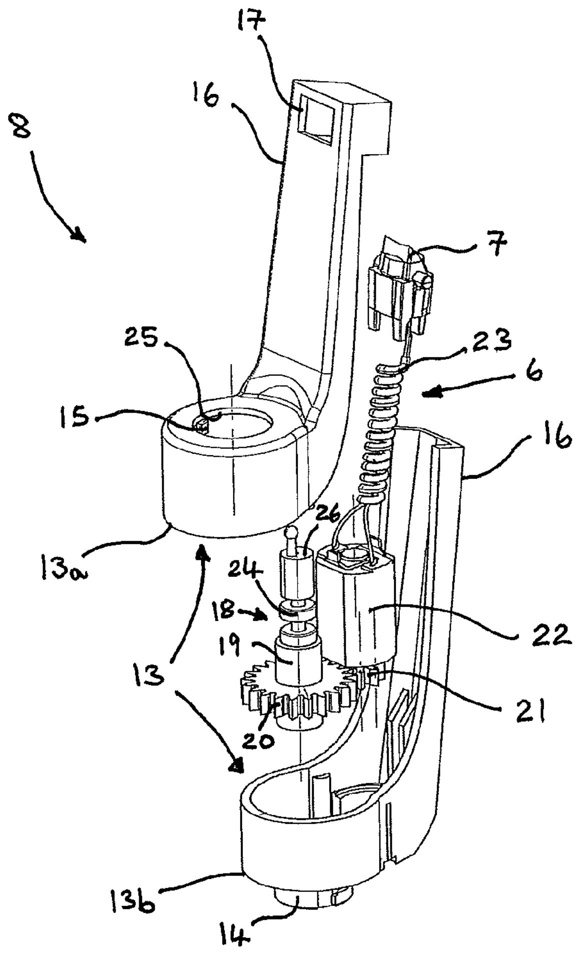
FIG. 6 shows an exploded perspective view of the module shown in FIGS. 4 and 5.
Figure 7:
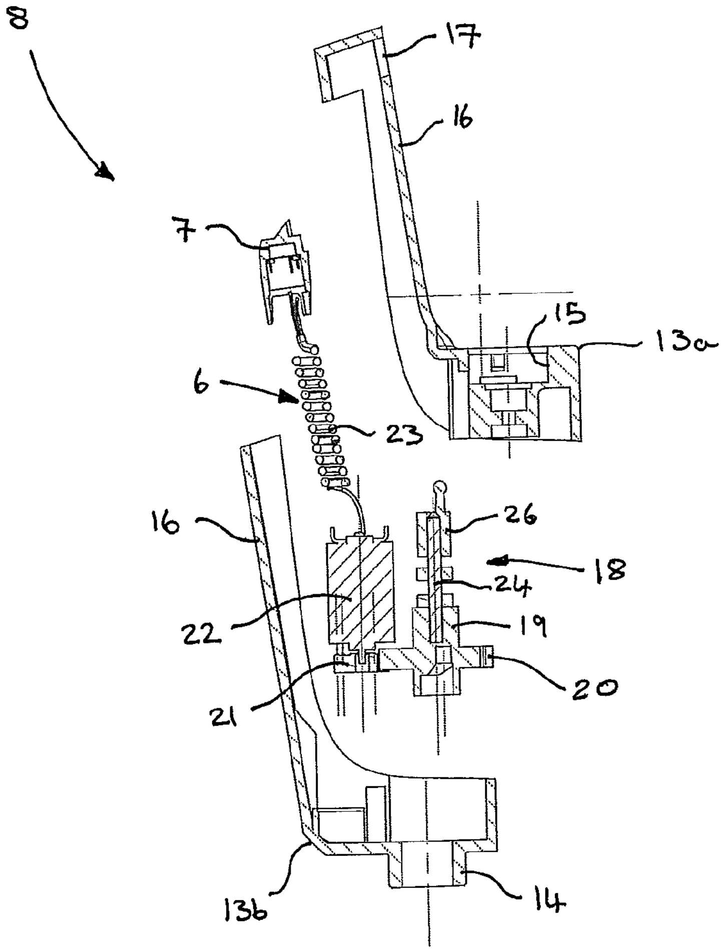
FIG. 7 is a cross-sectional side elevation of the module shown in FIG. 6.

The motor 5 which is contained within the housing 4, has a primary drive shaft 9 (see FIGS. 2 and 5). A coupling member 10 is mounted to the free end of the primary drive shaft 9. As demonstrated by FIGS. 1, 2 and 3, the coupling member 10 couples the primary drive shaft 9, and therefore the motor 5, to the movable member 3 via an actuating mechanism 11 in the mechanical function unit 2. The actuating mechanism 11 transmits drive from the motor 5 to the movable member 3 to cause reciprocation of the movable member 3 relative to a fixed member 12 for the purpose of cutting hair.

With reference to FIGS. 4 to 7, a module 8 is positionable between the housing 4 and the mechanical function unit 2. The module 8 comprises an enclosure 13 having a first interface 14 that connects the module 8 to the housing 4 and a second interface 15 that connects the mechanical function unit 2 to the module 8 so that the module 8 sits between the mechanical function unit 2 and the housing 4 and spaces them from each other. Each interface 14, 15 may be a push fit onto the housing 4 and onto the mechanical interface 2, respectively. Alternatively, a known type of twist lock or bayonet type connection may be employed. The enclosure 13 has a leg portion 16 that extends alongside the mechanical function unit 2 in a direction towards the movable member 3 and has an opening or transparent region 17 at its distal end that faces in a direction towards the movable member 3. As most clearly shown by FIGS. 6 and 7, the enclosure may be formed in two parts or halves, 13*a*, 13*b* that are firmly attach to each other when assembled to form a shell.

The module 8 contains a transmission or drive train 18 that includes a drive gear 19. When the interface 14 is attached to the housing 4, the coupling member 10 is received within and couples to the drive gear 19 so that the drive gear 19 will rotate together with the coupling member 10. The coupling between the coupling member 10 and the drive gear 19 occurs as a direct result of attaching the interface 14 to the housing 4. The drive gear 19 carries teeth 20 that mesh with corresponding teeth on a pinion 21 attached to a generator 22, such as a motor, of the electrical function unit 6 so that the generator 22 is driven via the drive gear 19 and the pinion 21 to generate electrical energy when the motor 5 is operational.

The electrical function unit 6 also comprises the electrically operative member 7 which, in the present embodiment, is a laser line generator. The laser line generator 7 is mounted within the leg portion 16 of the enclosure 13 close to its upper end and so that a laser L (see FIG. 4) generated by the laser line generator 7 is projected through the opening 17 in the enclosure 13 in a direction towards the movable member 3 to form a line S on the skin (not shown) of a user close to, or in alignment with, the movable member 3. The electrical function unit 6 includes conductive wiring 23 to electrically connect the generator 22 to the laser line generator 7 within the module 8.

The transmission or drive train 18 of the module 8 further comprises a secondary drive shaft 24 that extends from, and is fixedly attached to, the drive gear 19 so that the drive shaft 24 rotates together with the drive gear 19. A second coupling member 26, identical to coupling member 10, is mounted to the free end of the secondary drive shaft 24 and protrudes from the enclosure 13 through a hole 25. In the same way that the coupling member 10 couples the primary drive shaft 9 to the mechanical function unit 2 in FIGS. 1 to 3 when the module 8 is omitted, the second coupling member 26 couples the secondary drive shaft 24 of the transmission 18 to the mechanical function unit 2 so that the movable member 3 can still be driven via the primary drive shaft 9, the coupling member 10, the secondary drive shaft 24 and the secondary coupling member 26 of the transmission 18 of the module 8, and the actuating mechanism 11. It will be appreciated that the coupling member 26 couples to the mechanical function unit 2 as the interface 15 of the module 8 is attached to the mechanical function unit 2.

In use, when the motor 5 is energised by a battery 27 contained in the housing 4, the movable member 3 reciprocates relative to the fixed member 12 to perform the primary function of cutting hair. At the same time, the generator 22 is operational due to the mechanical connection via the drive gear 19 and the pinion 21 which rotates to drive the generator 22. The gearing of the drive gear 19 and pinion 21 is selected in order to drive the generator 22 at a speed that is sufficient to generate electrical power to operate the laser line generator 7 and project a laser line onto a user's skin adjacent to the movable member 3.

It will be appreciated that the electrical energy required to operate the laser line generator 7 is generated internally of the module 8 by the generator 22 and so there is no electrical connection between the source of electrical power used to drive the motor 5, i.e. the battery 27, and the electrical function unit 6 in the module 8. It is therefore easy to remove the module 8 from the housing 4, and to attach and remove the mechanical function unit 2 from the module 8, without being concerned about making or breaking any electrical terminals or connections.

Whilst the preferred embodiment is described with reference to an electrical function unit 6 for generating a laser line S, it will be appreciated that modules 8 for carrying out other electrical functions may alternatively be provided and which contain different electrical operative elements 7, such as lights, e.g. LEDs, sensors to detect, for example, humidity or temperature, or some other skin characteristic such as transepidermal water loss. The electrically operative element 7 may also be an image capturing device such as a small video camera or laser scanning device to enable digital augmented reality solutions, an ultrasonic mist generator unit or a pulsating piezoelectric synthetic jet generator. All of these electrically operative elements 7 can be supplied with power generated internally within the module by the generator 22.

As the module 8 is easily detachable from the housing 4 and the mechanical function unit 2, an end user may easily remove a module 8 to replace it either with another module 8 for performing the same secondary function or, with a module 8 of another type for carrying out a different secondary function, whilst using the same housing 4 and mechanical function unit 2. Alternatively, they may omit the module 8 altogether and mount the mechanical function unit 2 directly to the housing 4, as shown in FIG. 1, in circumstances where no secondary electrical function is required. In another, unillustrated embodiment, multiple modules 8, each of which contain different electrical function units 6, may be attached to each other in stacked relation and positioned between the housing 4 and the mechanical function unit 2 so that different electrically operated functions may be carried out simultaneously by each module 8.

It will be appreciated that, in the above described embodiments, the electrical function unit 6 only operates when the mechanical function unit 2 is operating, as the generator 22 is only driven whilst the mechanical function unit 2 operates. However, in a modified embodiment, the module 8 may contain a rechargeable battery which is charged by the generator 22 during operation of the mechanical function unit 2. This battery may then be used to power the electrical function unit 6 for a period of time when the generator 22 is inactive. For example, a user may wish to project a laser line S on their skin prior to operating the mechanical function unit 2. In another embodiment, the generator may be omitted together with the drive gear 19 and pinion 21. Instead, the electrical function unit may include a battery received in the module to power the electrically operative element. Such a battery may be rechargeable and/or replaceable as required. For example, the battery may be removable from the module for recharging or replacement. Alternatively, the entire module may have terminals that connect to terminals of a charging station when the module is removed from the appliance to charge the battery.

It will be appreciated that each of the embodiments of the present invention provide a device which is extremely flexible and adaptable to individual users requirements as well as being simpler and easier to manufacture.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A domestic appliance comprising:

a mechanical function unit comprising a cutting blade, a housing comprising a motor, wherein the motor is adapted to operate the cutting blade to carry out a primary function of the domestic appliance;

and an electrical function unit comprising a generator adapted to convert mechanical energy generated by the motor into electrical energy to power an electrically operative member, wherein the electrically operative member comprises a laser line generator and is adapted to perform a secondary function of the domestic appliance that supports the primary function performed by the mechanical function unit, wherein: the electrical function unit is wholly contained in a detachable module and is configured to be positioned between the mechanical function unit and the housing, such that the mechanical function unit is configured to operate with and without presence of the detachable module; the electrical function unit is mounted within a leg portion of an enclosure at an upper end of the enclosure so that a laser beam generated by the laser line generator is projected through an opening in the enclosure in a direction towards the cutting blade; and the domestic appliance is configured to operate in a first mode where a first end of the mechanical function unit is directly connected to a first end of the housing, and in a second mode where the first end of the mechanical function unit is connected a first end of the electrical function unit and a second end of the electrical function unit is connected the first end of the housing.

2. The domestic appliance according to claim 1, wherein the module is configured to be coupled to the housing, the module is configured to be coupled to the mechanical function unit, and the housing is configured to be coupled to the mechanical function unit without the module.

3. The domestic appliance according to claim 1, wherein connections between the module and the housing and between the module and the mechanical function unit are mechanical connections and not electrical connections.

4. The domestic appliance according to claim 1, wherein the module comprises a transmission that couples the motor in the housing to the cutting blade in the mechanical function unit and drives the generator, the transmission includes:

a drive gear that rotates in response to operation of the motor to drive the generator, and/or a drive shaft that engages with the cutting blade of the mechanical function unit, the drive shaft rotating in response to operation of the motor.

5. The domestic appliance according to claim 4, wherein the generator comprises a drive pinion in engagement with the drive gear of the transmission so that the transmission comprises the drive shaft, the generator is operated to generate electrical energy when the drive gear rotates.

6. The domestic appliance according to claim 4, wherein the mechanical function unit comprises an actuating mechanism so that the transmission comprises the drive shaft, that the actuation unit couples the drive shaft to the cutting blade.

7. The domestic appliance according to claim 4, wherein: the laser line generator is adapted to project a laser line onto the skin; and the domestic appliance further comprises a sensor that is adapted to detect humidity, temperature, or another skin characteristic.

8. A domestic appliance comprising:
a mechanical function unit comprising a cutting blade;
a housing comprising a motor, wherein the motor is adapted to operate the cutting blade to carry out a primary function of the domestic appliance;
an electrically operative member comprising a laser line generator; and an electrical function unit comprising a generator adapted to convert mechanical energy generated by the motor into electrical energy to power the electrically operative member and adapted to perform a secondary function of the domestic appliance that supports the primary function performed by the mechanical function unit, wherein the electrical function unit is wholly contained in a detachable module and is mounted within a leg portion of an enclosure at an upper end of the enclosure so that a laser beam generated by the laser line generator is projected through an opening in the enclosure in a direction towards the cutting member;
and the domestic appliance is configured to operate in a first mode where a first end of the mechanical function unit is directly connected to a first end of the housing, and in a second mode where the first end of the mechanical function unit is connected a first end of the electrical function unit and a second end of the electrical function unit is connected the first end of the housing.

9. The domestic appliance according to claim 8, wherein electrical energy is generated external to the mechanical function unit and supplied to the electrical function unit.

10. The domestic appliance according to claim 8, wherein the generator is contained within the electrical function unit, such that no electrical connection is present between a power supply in the housing and the electrical function unit.

11. The domestic appliance according to claim 8, wherein
the electrical function unit comprises a module that comprises a transmission that couples the motor in the housing to the cutting blade in the mechanical function unit and drives the generator,
the transmission includes:
a drive gear that rotates in response to operation of the motor to drive the generator, and/or
a drive shaft that engages with the cutting blade of the mechanical function unit, the drive shaft rotating in response to operation of the motor.

12. The domestic appliance according to claim 11 wherein the generator comprises a drive pinion in engagement with the drive gear of the transmission so that the generator is operated to generate electrical energy when the drive gear rotates.

13. The domestic appliance according to claim 11, wherein the laser line generator is adapted to project a laser line onto the skin; and the domestic appliance further comprises a sensor adapted to detect humidity, temperature, or another skin characteristic.

14. A domestic appliance comprising:
a mechanical function unit comprising a cutting blade;
a housing comprising a motor, wherein the motor is adapted to operate the cutting blade to carry out a primary function of the domestic appliance;
an electrically operative member comprising a laser line generator; a housing containing a motor adapted to operate the cutting blade to carry out a primary function of the domestic appliance; and an electrical function unit comprising a generator adapted to convert mechanical energy generated by the motor into electrical energy to power the electrically operative member and adapted to perform a secondary function of the domestic appliance that supports the primary function performed by a mechanical function unit, wherein the electrical function unit is wholly contained in a detachable module and is mounted within a leg portion of an enclosure at an upper end of the enclosure so that a laser beam generated by the laser line generator is projected through an opening in the enclosure in a direction towards the cutting blade;
and the domestic appliance is configured to operate in a first mode where a first end of the mechanical function unit is directly connected to a first end of the housing, and in a second mode where the first end of the mechanical function unit is connected a first end of the electrical function unit and a second end of the electrical function unit is connected the first end of the housing.

15. The domestic appliance according to claim 14, wherein the electrical function unit comprises a module, and connections between the module and the housing and between the module and the mechanical function unit are mechanical connections and not electrical connections.

16. The domestic appliance according to claim 15, wherein
the module comprises a transmission that couples the motor in the housing to the cutting blade in the mechanical function unit and drives the generator,
the transmission includes:
a drive gear that rotates in response to operation of the motor to drive the generator, and/or
a drive shaft that engages with the cutting blade of the mechanical function unit, the drive shaft rotating in in response to operation of the motor.

17. The domestic appliance according to claim 16, wherein the generator comprises a drive pinion in engagement with the drive gear of the transmission so that the generator is operated to generate electrical energy when the drive gear rotates.

18. The domestic appliance according to claim 16, wherein the mechanical function unit comprises an actuating mechanism that couples the drive shaft to the cutting blade.

* * * * *